(12) United States Patent
Mizukoshi

(10) Patent No.: US 7,023,648 B2
(45) Date of Patent: Apr. 4, 2006

(54) METHOD AND APPARATUS FOR WRITING SERVO DATA IN A DISK DRIVE

(75) Inventor: Seiji Mizukoshi, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/946,362

(22) Filed: Sep. 22, 2004

(65) Prior Publication Data

US 2005/0078403 A1    Apr. 14, 2005

(30) Foreign Application Priority Data

Oct. 9, 2003    (JP) .............................. 2003-350975

(51) Int. Cl.
*G11B 21/02*    (2006.01)

(52) U.S. Cl. ...................................... 360/75
(58) Field of Classification Search ..................... None
See application file for complete search history.

(56) References Cited

U.S. PATENT DOCUMENTS

| 5,926,336 | A |   | 7/1999 | Le et al. |
| 6,049,437 | A |   | 4/2000 | Wevers |
| 6,091,564 | A | * | 7/2000 | Codilian et al. ............... 360/75 |
| 6,519,107 | B1 | * | 2/2003 | Ehrlich et al. ................ 360/75 |
| 6,724,558 | B1 | * | 4/2004 | Bryant et al. ................. 360/75 |
| 6,819,518 | B1 | * | 11/2004 | Melkote et al. ............... 360/75 |
| 2002/0109933 | A1 |   | 8/2002 | Ashikaga et al. |

FOREIGN PATENT DOCUMENTS

| JP | 4-337577 | 11/1992 |
| JP | 2002-093083 | 3/2002 |

OTHER PUBLICATIONS

Austrian Search Report dated Feb. 24, 2005 for Appln. No. 200405088-6.

* cited by examiner

*Primary Examiner*—K. Wong
(74) *Attorney, Agent, or Firm*—Pillsbury Winthrop Shaw Pittman, LLP

(57) ABSTRACT

A disk drive having a servo writer is disclosed. The servo writer is configured to write a new servo pattern for which an offset is adjusted by using an offset value of a track unit with respect to a disk on which a basic servo pattern is recorded.

8 Claims, 6 Drawing Sheets

METHOD AND APPARATUS FOR WRITING SERVO DATA IN A DISK DRIVE

CROSS-REFERENCE TO RELATED APPLICATIONS

This application is based upon and claims the benefit of priority from prior Japanese Patent Application No. 2003-350975, filed Oct. 9, 2003, the entire contents of which are incorporated herein by reference.

BACKGROUND OF THE INVENTION

1. Field of the Invention

The present invention relates to a disk drive, and more particularly to a disk drive including a servo writer function.

2. Description of the Related Art

Generally, a disk drive as typified by a hard disk drive is configured to record data on a disk medium (simply referred to as a disk hereinafter) by using a magnetic head (simply referred to as a head hereinafter) or reproduce data from the disk.

In the disk drive, servo information (a servo pattern) which is used to position a head at a target position (a target track or a target cylinder as a read/write object) on the disk is recorded on the disk.

As a disk drive manufacturing step, there is a servo write step of recording (prerecording) a servo pattern on the disk. By this servo write step, a servo track including a servo area in which a servo pattern is recorded is constituted on the disk. In the servo track, with a servo area being determined as a reference, a range immediately before a next servo area in a circumferential direction may be referred to as a servo sector in some cases.

On the other hand, with a servo track being determined as a reference, a data track is constituted as an area in which user data is recorded. The data track includes a plurality of data sectors (data area which serves as an access unit) belonging to respective servo sectors. Each data sector is identified based on a sector address (sector number).

As a servo write method, there is a manufacturing method by which a servo track is recorded on a disk in advance by using a dedicated servo track writer (STW) in order to increase efficiency of the servo write step, and the disk on which this servo track is recorded is assembled into a disk drive (see, e.g., Jpn. Pat. Appln. KOKAI Publication No. 4-337577).

In this manufacturing method, there occurs a state (disk eccentricity) in which the track center of servo tracks having a concentric circular shape formed on a disk in advance does not necessarily match with the rotation center of the disk (rotational shaft of a spindle motor). In an actual disk drive, since data tracks are constituted with servo sectors constituting servo tracks being determined as a reference, eccentricity is generated between the rotation center of the disk and the rotation center of the data tracks.

Thus, there has been proposed a disk drive in which an offset quantity corresponding to an eccentricity quantity between a track center of the servo tracks and a rotation center of the disk is measured in advance and an offset table for the eccentricity quantity is prepared on a memory (see, e.g., Jpn. Pat. Appln. KOKAI Publication No. 2002-93083). This disk drive makes reference to an offset quantity from this offset table and executes a positioning compensation when controlling a head to be positioned at a target data track on the disk.

In this method by which the offset quantity is prepared in the memory, when the offset quantity is erased from the memory, the positioning compensation using the offset quantity is impossible. Further, a step of storing the offset quantity in the memory of the disk drive is required. Furthermore, in the head positioning operation of the disk drive, processing for constantly making reference to the offset quantity from the memory is required.

BRIEF SUMMARY OF THE INVENTION

In accordance with one embodiment of the present invention, there is provided a disk drive including facilities for writing servo data.

The disk drive comprises a head which records or reproduces data including a new servo pattern with respect to a disk medium having a disk surface on which a basic servo pattern is recorded in advance; a positioning control unit which positions the head at a target position on the disk medium based on the basic servo pattern reproduced by the head or a new servo pattern; a calculation unit which calculates an offset value of a track unit based on the basic servo pattern reproduced by the head positioned at the target position; and a servo write unit which writes the new servo pattern on the disk medium with the head by using track positional information included in the basic servo pattern and the offset value.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described with reference to the accompanying drawings.

(Structures of Disk Drive and Servo Writer)

Figure 1:
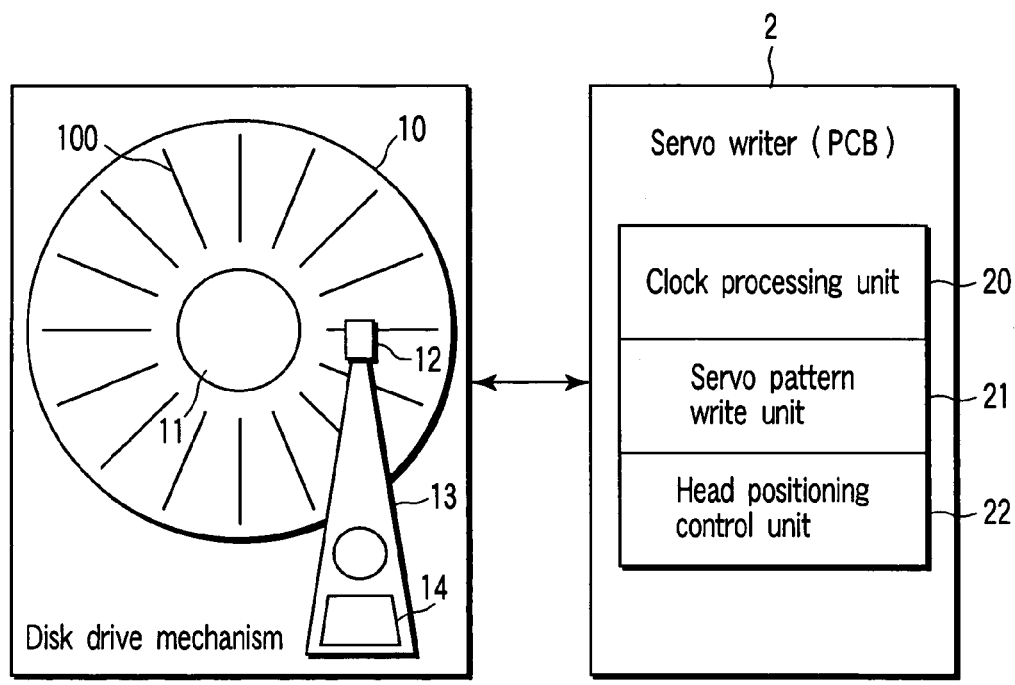
FIG. 1 is a block diagram showing a structure of a disk drive including a servo writer function concerning an embodiment according to the present invention.
Figure 5:
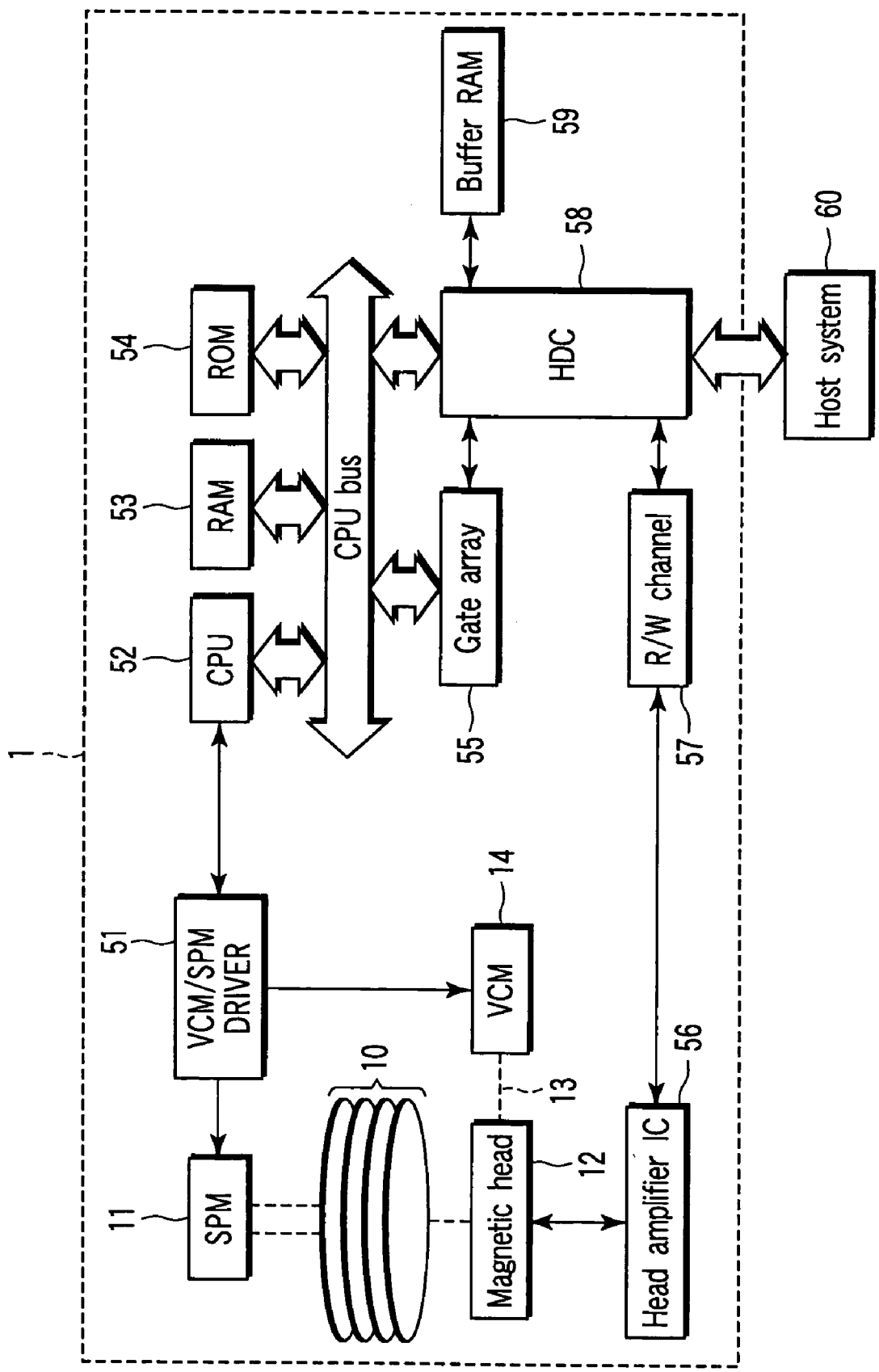
FIG. 5 is a block diagram showing a primary part of a disk drive concerning the embodiment.

FIG. 1 is a block diagram showing a structure of a disk drive having a servo writer concerning this embodiment. FIG. 5 is a block diagram showing a primary part of the disk drive.

(Structure of Disk Drive)

The disk drive according to this embodiment has, as shown in FIG. 1, a disk drive mechanism 1 and a printed circuit board (PCB) 2 having a circuit group which realize a function of a servo writer mounted thereon. As will be described later, a CPU 52 or an HDC 58 is mounted on the PCB 2 (see FIG. 5). A servo writer according to this embodiment is realized by the CPU 52, the HDC 58 or the like. This will be referred to as a servo writer 2 hereinafter for the sake of convenience.

In the disk drive mechanism 1 are incorporated a disk 10 which is attached to a spindle motor (SPM) 11 and rotated, and a head 12 which is mounted on an actuator 13. The actuator 13 is a mechanism which is driven by a voice coil motor (VCM) 14 and moves the head 12 in a radial direction on the disk 10.

In the disk drive according to this embodiment is incorporated the disk 10 having a disk surface on which basic servo patterns (which will be referred to as base servo patterns or BSPs in some cases) are recorded in a circumferential direction at predetermined intervals by a regular servo track writer. The contents of the basic servo pattern 100 are the same as of a regular servo pattern (corresponding to a new servo pattern which is newly recorded in this embodiment) (see FIG. 2).

Moreover, the disk 100 comprises one or more disk platters, and has two or more disk surfaces. The basic servo patterns 100 are recorded on one disk surface alone irrespective of the number of disk platters.

The head 12 has a structure in which a read head element which performs a read operation and a write head element which carries out a write operation are mounted on a slider. In the head 12, the basic servo patterns 10 area read from the disk 10 by using the read head element. Additionally, later-described new servo patterns are written on the disk by using the write head element.

Here, the disk drive has, as shown in FIG. 5, a VCM/SPM driver 51, a microprocessor (CPU) 52, an RAM 53, an ROM 54, a gate array 55, a head amplifier IC 56, a read/write (R/W) channel 57, a disk controller (HDC) 58, and a buffer RAM 59 as well as the drive mechanism 1.

The VCM/SPM driver 51 is a motor driver which controls the SPM 11 and the VCM 14 to be driven. The CPU 52 is a main control device for the disk drive and, as described above, it is a main part of the read/write control for data including a regular head positioning control and the servo writer. The RAM 53 and the ROM 54 are memories in which a program of the CPU 52 and various kinds of data are stored.

The gate array 55 is a circuit corresponding to a servo controller which executes generation of various signals such as a servo signal or a sector pulse or an input/output control. The head amplifier IC 56 supplies a read/write signal between the head 12 and the R/W channel 57.

The R/W channel 57 is a processing circuit for the read/write signal, and reproduces data (servo and user data) from a read signal read by the head 12. Further, the R/W channel 57 converts (recording encoding) recording data (including a new servo pattern) output from the HDC 58 into a recording signal, and outputs it to the head amplifier IC 56.

The HDC 58 constitutes an interface between the disk drive and a host system 60, and executes a data transfer control by using the buffer RAM 59.

(Structure of Servo Writer)

The servo writer 2 has the CPU 52 as a main portion, and is realized by utilizing respective functions of the HDC 58, the head amplifier IC 56 and the R/W channel 57. The servo writer 2 roughly realizes respective functions of a clock processing unit 20 which is used to generate various kinds of clocks, a servo pattern write unit 21, and a head positioning control unit 22.

The clock processing unit 20 realizes a clocking function which determines a write timing when writing a necessary new servo pattern. Specifically, the clock processing unit 20 determines this write timing in a disk rotation direction based on the basic servo pattern read by using the head 12 (read head element).

The servo pattern write unit 21 supplies a servo signal which is used to write a new servo pattern on the disk 10 by using the head 12 (write head element). The head positioning control unit 22 executes a positioning control over the head 12 by controlling the actuator 13 (which is actually the VCM 14) based on the basic servo pattern read by the head 12 (read head element). That is, the head positioning control unit 22 executes the head positioning operation with respect to a radial direction of the disk 10.

It is to be noted that a positioner as an external positioning mechanism or a clock head is not required in the disk drive according to this embodiment. Furthermore, since the disk drive including the servo writer 2 is in a sealed state, a clean room is not required either. Moreover, the servo writer 2 may be eliminated from the manufactured disk drive by erasing a program stored in the memory mounted on the PCB after completion of writing of a new servo pattern.

Figure 2:
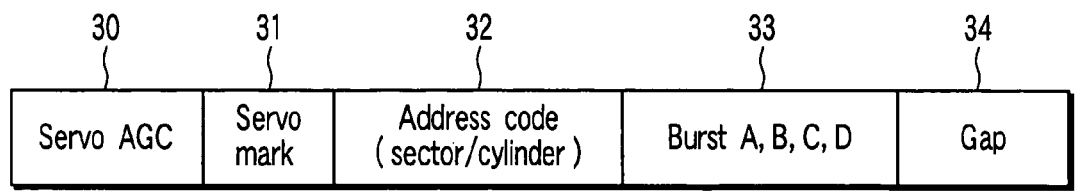
FIG. 2 is a view showing a format of a servo pattern concerning the embodiment.

As shown in FIG. 2, the basic servo pattern 100 comprises a format which has a preamble portion (servo AGC) 30, a servo mark portion 31 and a gap 34 and also has an address code portion 32 and a servo burst portion (A to D) 33 as main portions.

The address code portion 32 has a sector address and a cylinder address (track positional information) recorded therein. The servo writer 2 detects a track position (position in the radial direction) of the head 12 based a cylinder address read by the head 12.

Additionally, the servo writer 2 obtains a detailed position in a track (cylinder) by using servo burst patterns A to D recorded in the servo burst portion 33. That is, the servo writer 2 executes a positioning operation for the head 12 and determines a write position for a new servo pattern based on the servo information (servo patterns).

(Servo Write Method)

A servo write method according to this embodiment will now be described with reference to FIGS. 3, 4, 6 and 7 and a flowchart of FIG. 8.

Figure 3:
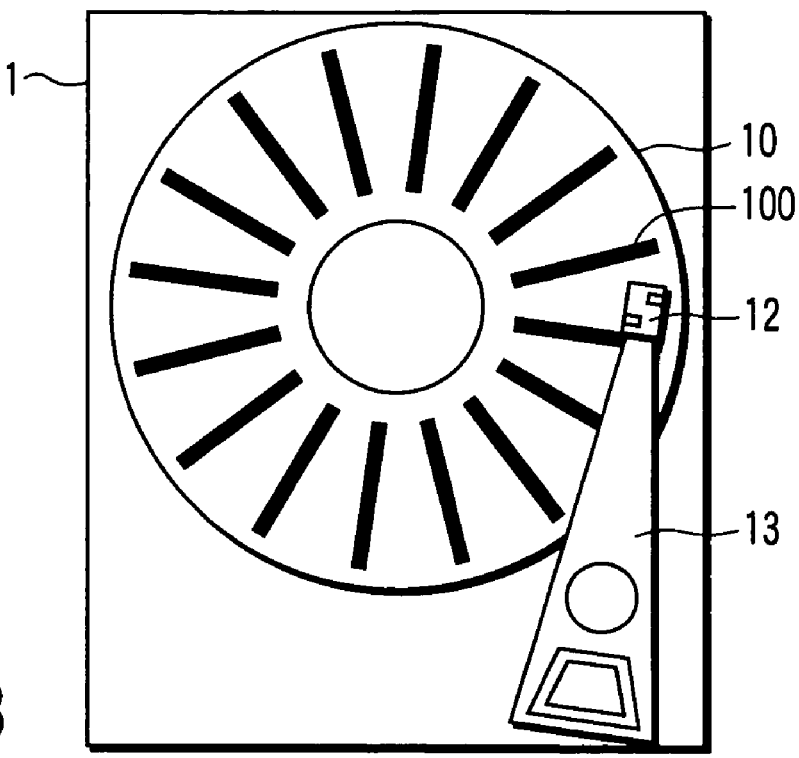
FIG. 3 is a view showing a recording state of a basic servo pattern concerning the embodiment.
Figure 4:
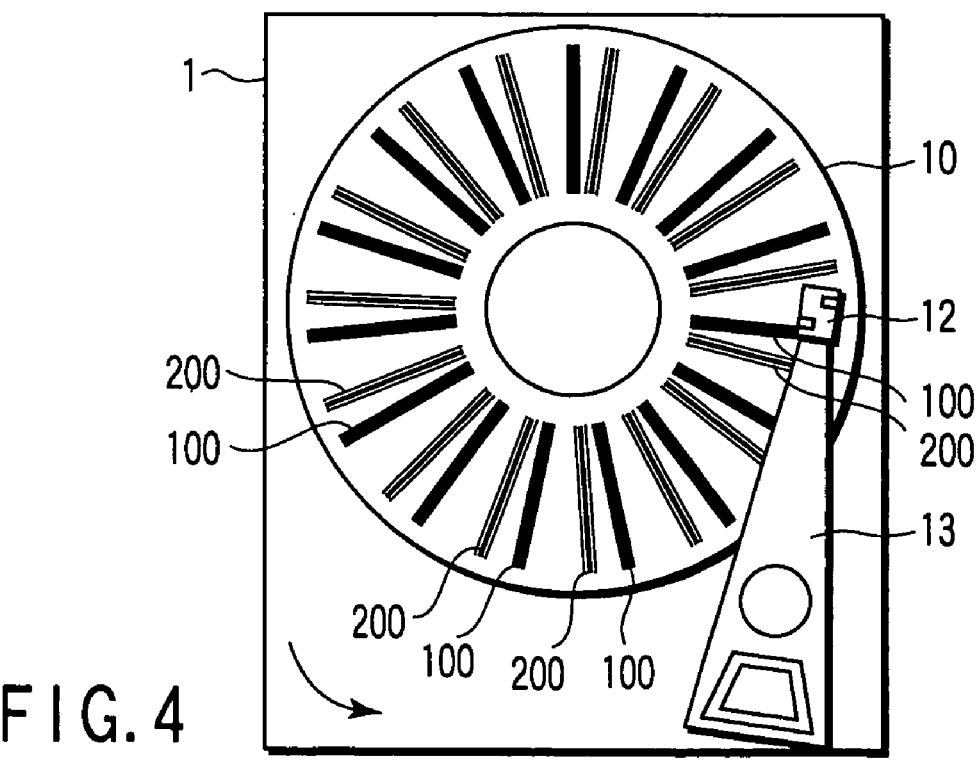
FIG. 4 is a view showing a recording state of a new servo pattern concerning the embodiment.

As shown in FIG. 3, the servo writer 2 according to this embodiment carries out a positioning operation for the head 12 by using the basic servo patterns 100 recorded on the disk surface in advance, and executes an operation of writing new servo patterns 200 on the disk 10 (see FIG. 4).

The new servo pattern 200 comprises the same format as that of the basic servo pattern 100, and is recorded on each disk surface on the disk 10. As shown in FIG. 4, the servo writer 2 records the new servo patterns 200 on rear stages in the circumferential direction with respect to the basic servo patterns 100. In FIG. 4, an arrow means a rotational direction of the disk 10. In other words, the servo writer 2 performs processing of rewriting the new servo patterns 200 by using the basic servo patterns 100.

Here, when incorporating the disk 10 in the drive mechanism 1, the basic servo pattern 100 previously recorded on the disk surface includes an offset quantity. The servo writer 2 writes each new servo pattern 200 by using this offset quantity. A definition of the offset quantity and its measurement method will now be described.

Figure 6:
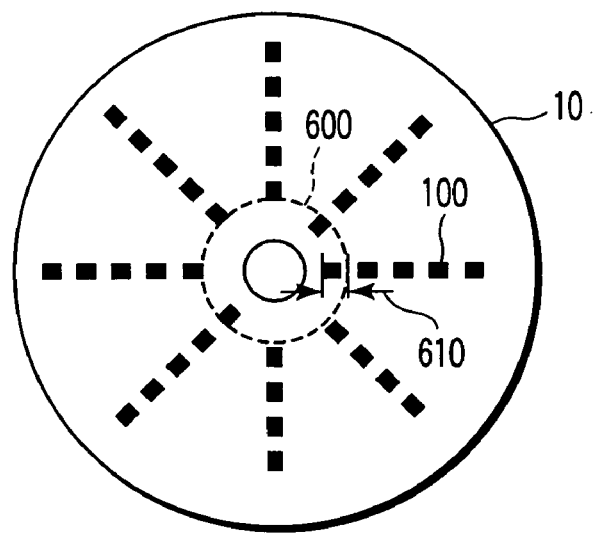
FIG. 6 is a view illustrating an offset concerning the embodiment.

As shown in FIG. 6, for example, a positional error quantity (track unit) of a position from a rotation center on the actual servo track with respect to a reference value (concentric circle) 600 of a distance from a rotation center of the disk 10 in an innermost circumferential area on the disk is defined as an offset quantity 610.

With the head 12 being moved to come into contact with a stopper in, e.g., an inner peripheral direction (which may be an outer peripheral direction) on the disk 10, the servo writer 2 calculates this offset quantity 610 based on a position when a cylinder address of the basic servo pattern and a servo burst pattern are read by using the head 12.

The servo writer 2 saves an offset value corresponding to the measured offset quantity 610 in, e.g., the RAM 53, and makes reference to this value when performing a later-described servo write operation. Table information indicative of each offset value corresponding to a sector address and a cylinder address is saved in the RAM 53.

A description will now be given as to a procedure of the servo write operation corresponding to one track concerning this embodiment with reference to FIG. 7 and the flowchart of FIG. 8.

The servo writer 2 causes the head 12 to seek based on the basic servo patterns 100 until it reaches a target track (step S1). For example, as shown in FIG. 7, the head 12 is moved to a track position at an innermost circumferential cylinder address 77 of the basic servo pattern 100.

The servo writer 2 waits until the seek operation is completed and the servo write operation begins (step S2). Then, the servo writer 2 reads the basic servo pattern 100 which was passed immediately before by using the head 12, and obtains a sector address as a rewrite operation target (steps S3 and S4).

The servo writer 2 acquires an offset value from the table information stored in the RAM 53 based on the obtained sector address and a target cylinder address (700) (step S5). The servo writer 2 calculates a new cylinder address (710) obtained by adding the offset value to the target cylinder address (700) (step S6).

The servo writer 2 prepares a new servo pattern 200 including this new cylinder address (710), and writes it at a position following the basic servo pattern 100 as shown in FIG. 4 (step S7).

The servo writer 2 repeats the above-described processing until the new servo patterns 200 corresponding to one track are written (step S8). Further, the servo writer 2 repeats the above-described processing with respect to the entire disk surface of the disk 10.

Figure 7:
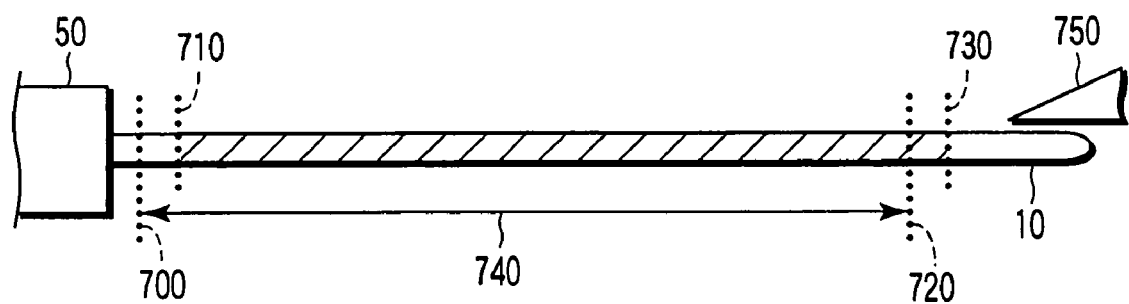
FIG. 7 is a view illustrating a recording position of a new servo pattern concerning the embodiment.
Figure 8:
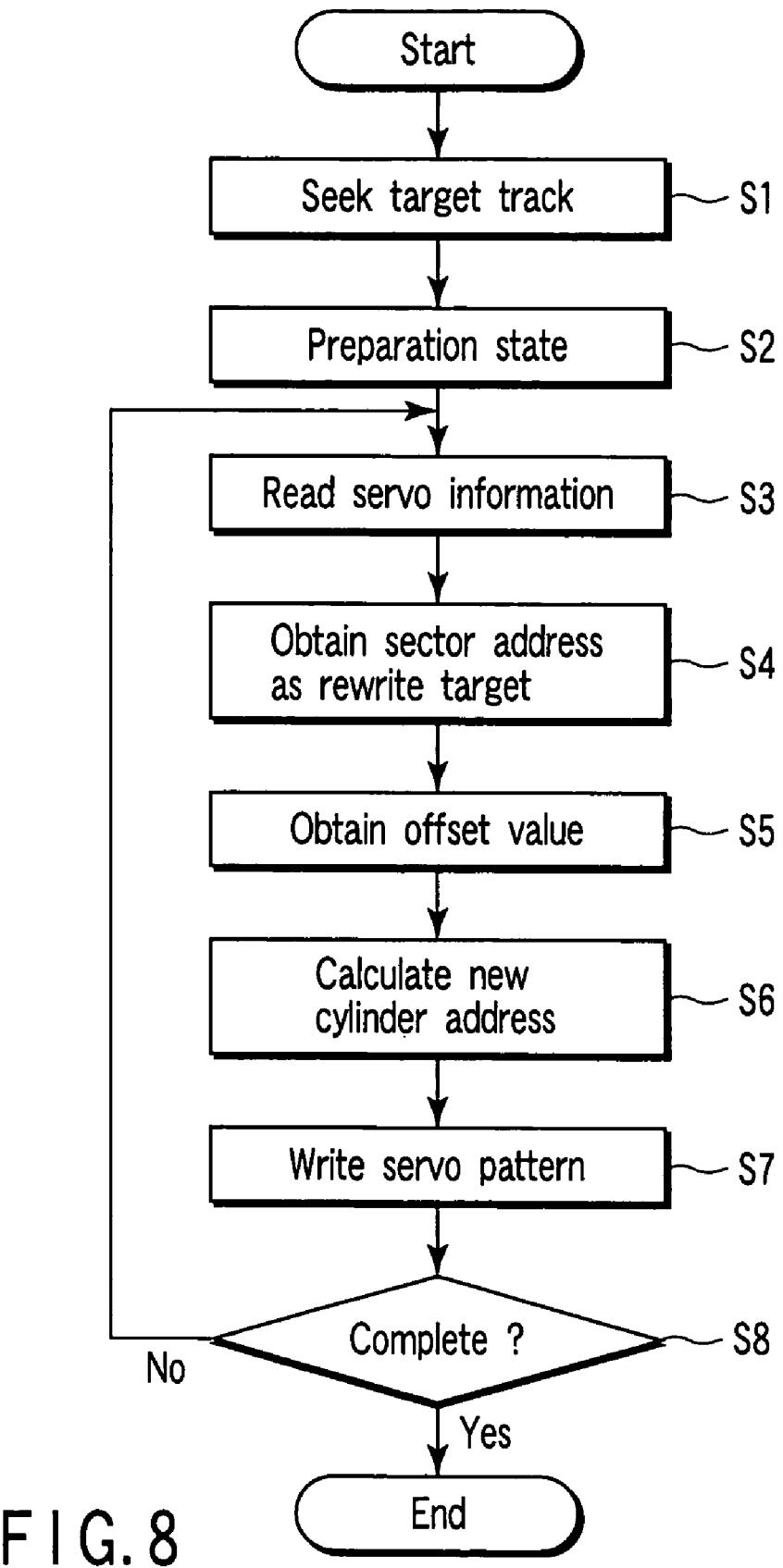
FIG. 8 is a flowchart illustrating a procedure of a servo write operation concerning the embodiment.

Here, as shown in FIG. 7, the servo writer 2 calculates a new cylinder address 730 obtained by adding the offset value with respect to the outermost circumferential cylinder address 720 of the basic servo pattern 100. That is, the data area in the new servo pattern 200 falls within a range between the innermost circumferential cylinder address 710 and the outermost circumferential cylinder address 730 with respect to a data area 740 of the basic servo pattern 100 which is not adjusted with the offset quantity.

It is to be noted that reference numeral 750 denotes a parking (ramp) member 750 which is used to retract the head 12 in FIG. 7.

It is to be noted that the offset quantity to be used may be the same value or different values with respect to all the sectors on the servo track. However, the same offset quantity must be used for the servo patterns having the same sector address.

As described above, in the servo write method according to this embodiment, the offset quantity measured based on the basic servo pattern 100 recorded on the disk 10 in advance is used, and the new servo pattern 200 including the cylinder address adjusted with the offset is written. In other words, the basic servo pattern 100 including the offset can be rewritten into the new servo pattern 200 from which the offset is eliminated.

Therefore, by applying the method according to this embodiment to the disk drive, the head positioning operation is executed based on the new servo pattern 200 with which the offset is adjusted, thereby eliminating positioning compensation processing using the offset quantity in the positioning operation. As a result, the offset value corresponding to this offset quantity does not have to be saved in the memory of the disk drive.

It is to be noted that the basic servo pattern 100 is erased by overwriting at a step of recording user data by the head 12 positioned based on the new servo pattern 200 after product shipment of the disk drive. In this case, as shown in FIG. 7, since a part of the basic servo pattern 100 (including the cylinder address 700) recorded in, e.g., the innermost circumferential area is out of the range of a regular data area (area in which user data is recorded) on the disk, it remains on the disk 10.

Furthermore, after termination of the servo write operation, an erasing step of erasing the basic servo pattern 100 remaining on the disk 10 may be added to the manufacturing step.

(Another Embodiment)

Figure 9:
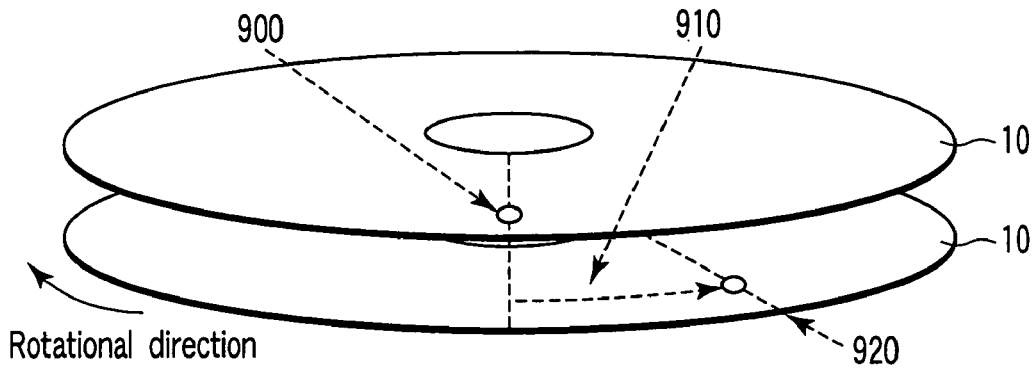
FIG. 9 is a view illustrating a servo write operation concerning another embodiment.
Figure 10:
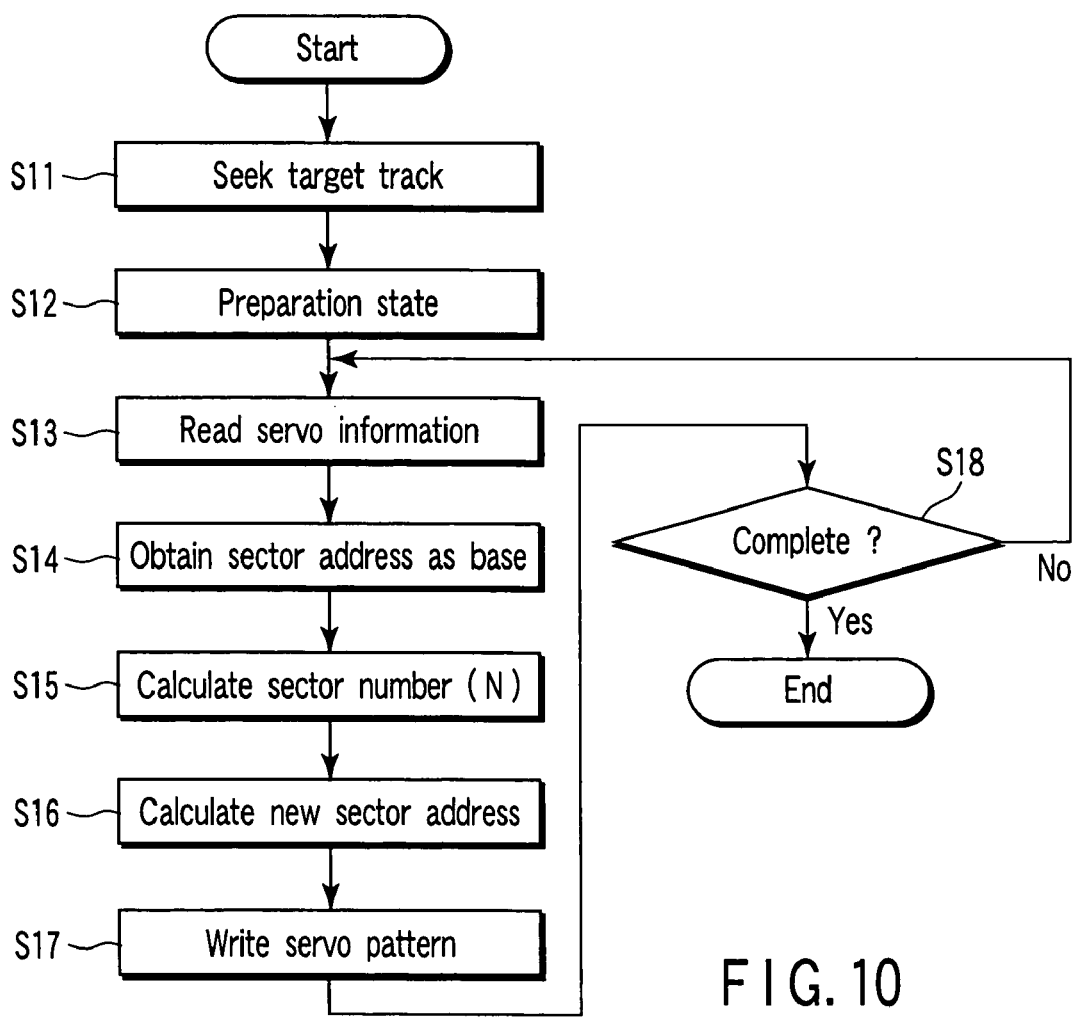
FIG. 10 is a flowchart illustrating a procedure of the servo write operation concerning another embodiment.

FIGS. 9 and 10 are views concerning another embodiment. This embodiment relates to a servo write method for writing a new servo pattern whose sector address is shifted for a quantity corresponding to a head switching time (head skew time) for each disk surface when setting addresses on each disk surface of the disk 10.

A principle of an access operation involved by a head switching operation will now be described with reference to FIG. 9.

As shown in FIG. 9, in a disk drive in which, e.g., two disks 10 are incorporated, it is assumed that the head is located at a given position 900 on the disk surface of the first disk before head switching (head change). At this time, when the head switching operation is executed and sectors on the disk surface of the second disk are accessed, the head is relatively moved by a distance 910 of a servo sector number N corresponding to the head switching time.

Thus, the servo write method according to this embodiment rewrites the servo pattern in order to obtain a position 920 with which sector addresses which are continuously accessed after occurrence of the head switching at the time of sequential access are distanced by the servo sector number N corresponding to the head switching time.

That is, in the disk drive that a distance corresponding to the head switching time advances for the servo sector number N, if a next address of a last sector address in a head 1 corresponding to the first disk surface is a top sector address of a head 2 corresponding to the second disk surface, the servo pattern is written in such a manner that a sector address corresponding to the head 2 placed directly below a sector address 0 corresponding to the head 1 becomes the last sector address.

By such a servo write method, the read/write operation for data in the top sector can be started immediately after completion of head switching when head switching occurs at the time of sequential access.

A procedure of the servo write operation corresponding to, e.g., one track will now be described with reference to a flowchart of FIG. 10.

Here, a head used for positioning (tracking) is determined as a reference head, and a head as a write target is determined as a target head. First, the servo writer 2 causes the reference head to seek until it reaches a target track based on the basic servo pattern 100 (step S11). The servo writer 2 waits until the servo write operation starts upon completion of the seek operation (step S12).

Then, the servo writer 2 reads the basic servo pattern 100 which was passed immediately before by the reference head, and obtains a sector address which becomes a base (steps S13 and S14). The servo writer 2 acquires a servo sector number N corresponding to a head switching time from the reference head to the target head (step S15).

The servo writer 2 calculates a new sector address obtained by adding the servo sector number N to the acquired sector address (step S16). The servo writer 2 prepares a new servo pattern 200 including this new sector address, and writes it at a position following the basic servo pattern 100 (step S17).

The servo writer 2 repeats the above-described processing until the new servo patterns 200 corresponding to one track are written (step S18). Moreover, the servo writer 2 repeats the above-described processing with respect to the entire disk surface of the disk 10.

If the above-described servo write method is adopted, the time from head switching to data access at the time of sequential access can be reduced without having a special offset table or the like.

As mentioned above, according to each embodiment, it is possible to provide the disk drive having the servo write function of writing the new servo pattern based on an offset quantity included in the basic servo pattern. Therefore, it is not necessary to store the offset quantity in the memory or execute the positioning compensation operation based on the offset quantity in the head positioning operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A disk drive comprising:
   a head which records or reproduces data including one or both of a basic servo pattern and a new servo pattern with respect to a disk medium having a disk surface on which the basic servo pattern is recorded in advance, the head including a read head element which reproduces the data and a write head element which records the data;
   a positioning control unit which positions the head at a target position on the disk medium in accordance with one of the basic servo pattern and the new servo pattern reproduced by the head;
   an obtaining unit which obtains an offset value according to track position information of the basic servo pattern reproduced by the head at the target position, the offset value being a positional error between a reference position from a rotation center of the disk medium and an actual position from a rotation center of tracks formed based on the basic servo pattern; and
   a servo write unit which writes the new servo pattern on the disk medium with the head by using the track position information and the offset value.

2. The disk drive according to claim 1, wherein
   the new servo pattern includes new track position information calculated by adding the track position information, and
   the positioning control unit positions the head at a target position in accordance with the new servo pattern when recording user data on the disk medium.

3. The disk drive according to claim 2, wherein
   the disk medium is in a state in which there remains apart of a basic servo pattern other than the basic servo pattern which is erased when the user data is recorded by the head positioned in accordance with the new servo pattern by the positioning control unit.

4. The disk drive according to claim 2, wherein
   the disk medium is in a state in which the basic servo pattern and a part of the new servo pattern remain in an innermost circumferential side area or an outermost circumferential side area other than a data recording area in which the user data is recorded by the head.

5. The disk drive according to claim 1, wherein
   the disk drive has a plurality of heads corresponding to the number of disk surfaces of the disk medium, and
   the servo write unit writes the new servo pattern from a position corresponding to a switching time involved in a head switching operation when writing the new servo pattern over different disk surfaces.

6. A method of writing servo data in a disk drive, the disk drive including a disk medium on which a basic servo pattern is recorded in advance and a head which executes a read/write operation of data including one or both of a basic servo pattern and a new servo pattern, the method comprising:
   positioning the head at a target position on the disk medium in accordance with the basic servo pattern;
   reproducing the basic servo pattern by using the head positioned at the target position;
   obtaining an offset value according to track position information of the basic servo pattern reproduced by the head at the target position, the offset value being a positional error between a reference position from a rotation center of the disk medium and an actual position from a rotation center of tracks formed based on the basic servo pattern; and
   writing a new servo pattern on the disk medium with the head by using the track position information and the offset value.

7. The method according to claim 6, wherein
   the writing calculates the new track position information by adding the track position information and the offset value, and writes the new servo pattern in accordance with the new track position information.

8. The method according to claim 6, wherein the disk drive has a plurality of heads corresponding to the number of disk surfaces of the disk medium, the method further comprising:

writing the new servo pattern from a position corresponding to a switching time involved in a head switching operation when writing the new servo pattern over different disk surfaces.

* * * * *